(12) United States Patent
Chilukuri

(10) Patent No.: US 10,540,700 B1
(45) Date of Patent: Jan. 21, 2020

(54) PERSONAL SHOPPING ASSISTANT

(71) Applicant: RoboSystems, Inc., Cupertino, CA (US)

(72) Inventor: Surya Chilukuri, Cupertino, CA (US)

(73) Assignee: RoboSystems, Inc., Cupertino, CA (US)

( * ) Notice: Subject to any disclaimer, the term of this patent is extended or adjusted under 35 U.S.C. 154(b) by 0 days.

(21) Appl. No.: 16/382,065

(22) Filed: Apr. 11, 2019

(51) Int. Cl.
| G06Q 50/30 | (2012.01) |
| G06Q 50/28 | (2012.01) |
| G06Q 30/06 | (2012.01) |
| G06K 7/10 | (2006.01) |
| H04N 5/225 | (2006.01) |
| G08B 5/36 | (2006.01) |
| G06Q 30/02 | (2012.01) |
| H04N 5/247 | (2006.01) |
| G08B 21/18 | (2006.01) |

(52) U.S. Cl.
CPC ..... *G06Q 30/0613* (2013.01); *G06K 7/10297* (2013.01); *G06Q 30/0633* (2013.01); *G06Q 30/0639* (2013.01); *H04N 5/2253* (2013.01); *G06Q 30/0259* (2013.01); *G08B 5/36* (2013.01); *G08B 21/18* (2013.01); *H04N 5/247* (2013.01)

(58) Field of Classification Search
CPC ........... G06Q 30/0613; G06Q 30/0639; G06Q 30/0633; G06Q 30/0259; G06K 7/10297; G08B 21/18; G08B 5/36; H04N 5/2253; H04N 5/247
See application file for complete search history.

(56) References Cited

U.S. PATENT DOCUMENTS

| 5,493,107 | A | * | 2/1996 | Gupta | G06K 1/121 235/383 |
| 5,851,488 | A | * | 12/1998 | Saul | G01N 21/6428 422/67 |
| 6,236,978 | B1 | * | 5/2001 | Tuzhilin | G06Q 30/018 705/14.25 |
| 6,328,329 | B1 | * | 12/2001 | Smith | B62B 3/027 280/33.991 |
| 7,010,501 | B1 | * | 3/2006 | Roslak | G06Q 20/20 705/23 |
| 7,461,783 | B2 | * | 12/2008 | Rostosky | G07G 1/0045 235/383 |
| 7,925,549 | B2 | * | 4/2011 | Looney | G06Q 30/02 705/14.49 |
| 7,988,045 | B2 | * | 8/2011 | Connell, II | G06Q 20/208 235/383 |
| 8,148,921 | B2 | * | 4/2012 | Elberbaum | G08C 23/06 315/363 |

(Continued)

Primary Examiner — Philip P. Dang
(74) Attorney, Agent, or Firm — GSS Law Group; Gregory S. Smith; Phillip M. Wagner

(57) ABSTRACT

A portable data terminal device configured as a personal shopping assistant (PSA) may display information about product locations in a store, product features, and alternative product recommendations upon request by a customer visiting the store's physical location. The PSA may detect and identify items placed into a shopping container, maintain an inventory of items selected for purchase, and communicate the inventory to a check-out station for rapid and convenient check-out and payment by the customer before leaving the store. The PSA may detect its location in a store and may activate an alarm when the PSA is moved outside a geofence boundary.

18 Claims, 10 Drawing Sheets

(56) References Cited

U.S. PATENT DOCUMENTS

| | | | | |
|---|---|---|---|---|
| 8,577,590 B2 * | 11/2013 | Doyle | | G06Q 10/08 342/450 |
| 8,755,824 B1 * | 6/2014 | Wang | | H04W 4/021 455/456.3 |
| 9,098,871 B2 * | 8/2015 | Argue | | G06T 7/00 |
| 9,174,660 B2 * | 11/2015 | Sonnendorfer | | B62B 3/1408 |
| 9,221,486 B2 * | 12/2015 | Fine | | B62B 5/0003 |
| 9,284,755 B2 * | 3/2016 | Rowe | | E05B 81/72 |
| 9,485,834 B2 * | 11/2016 | Noguchi | | H02J 9/06 |
| 9,489,793 B2 * | 11/2016 | Williams | | A63F 13/216 |
| 9,549,287 B2 * | 1/2017 | Baran | | H04W 8/02 |
| 9,596,565 B2 * | 3/2017 | Huang | | H04M 1/72572 |
| 9,626,684 B2 * | 4/2017 | Angell | | G06Q 30/02 |
| 9,669,856 B2 * | 6/2017 | Hunt | | B62B 3/1468 |
| 9,892,424 B2 * | 2/2018 | Abraham | | G06Q 30/0251 |
| 10,326,300 B2 * | 6/2019 | Jones | | H02J 7/1407 |
| 2002/0026380 A1 * | 2/2002 | Su | | G06Q 30/06 705/26.8 |
| 2002/0161658 A1 * | 10/2002 | Sussman | | G06Q 30/0207 705/26.8 |
| 2004/0249721 A1 * | 12/2004 | Morisada | | G06Q 30/06 705/26.41 |
| 2006/0089918 A1 * | 4/2006 | Avanzi | | G06Q 20/382 705/64 |
| 2008/0249835 A1 * | 10/2008 | Angell | | G06Q 30/02 705/7.33 |
| 2008/0290182 A1 * | 11/2008 | Bell | | G06Q 10/04 235/61 V |
| 2011/0093875 A1 * | 4/2011 | Simmons | | G06Q 30/0603 725/5 |
| 2012/0078755 A1 * | 3/2012 | Subbarao | | G06Q 30/0641 705/27.1 |
| 2012/0253905 A1 * | 10/2012 | Darragh | | G06Q 30/00 705/14.19 |
| 2014/0081766 A1 * | 3/2014 | Maass | | G06Q 20/10 705/14.64 |
| 2016/0012465 A1 * | 1/2016 | Sharp | | G06Q 20/18 705/14.17 |
| 2016/0110703 A1 * | 4/2016 | Herring | | G01G 19/4144 705/23 |
| 2017/0153905 A1 * | 6/2017 | Chopra | | G06F 3/0482 |
| 2018/0060269 A1 * | 3/2018 | Kessler | | G06F 13/4022 |
| 2018/0162432 A1 * | 6/2018 | Jones | | G01C 22/00 |
| 2018/0268818 A1 * | 9/2018 | Schoenmackers | | G10L 15/22 |
| 2018/0322861 A1 * | 11/2018 | Ibrahim | | G10K 11/17885 |
| 2019/0018467 A1 * | 1/2019 | Patterson | | G06F 1/266 |
| 2019/0026067 A1 * | 1/2019 | Baek | | G06F 3/165 |
| 2019/0057435 A1 * | 2/2019 | Chomley | | B62B 3/14 |

* cited by examiner

US 10,540,700 B1

PERSONAL SHOPPING ASSISTANT

FIELD OF THE INVENTION

Embodiments are generally related to portable data terminals for collecting and displaying customer-related and/or product-related information in a shop or store.

BACKGROUND

A customer entering a small neighborhood store may be greeted personally by a store employee. The store employee may offer the customer assistance in locating a particular item or may suggest an alternative product if the item named by the customer is not available. A store that offers such personalized service is likely to benefit from repeat visits and repeat purchases by a loyal customer base.

A person entering a large retail establishment such as a supermarket, building supply store, home accessories store, or other warehouse-style or "big box" stores may have a very different experience compared to the personalized service that may be available from a neighborhood store. Upon entering the store, the shopper may have difficulty identifying the aisle or department of the store where a product of interest may be found. Descriptive signs at the ends of aisles may be too far away to read or may follow an organizational approach not understood by the shopper, causing some shoppers to wander the aisles looking for a desired product. Some stores may place related products in widely-separated locations in the store to increase the amount of time shoppers spend in the store, a strategy that may increase sales volume from impulse purchases.

A shopper may have difficulty locating an alternative product if the product originally being sought is not found. In an effort to reduce operating costs, the store may have few employees available for answering inquiries from customers about product locations, product features, or alternative products. Should a suitable product be located, the customer may stand in a long or slow-moving check-out line to pay for selected items, either a manual check-out line where a cashier scans purchased items one-by-one and collects payment from the customer, or a self-check-out line where the customer must first determine how to operate the product code scanner and credit card reader used by the store, scan items one by one, and bag items himself or herself. When the self-check-out station does not recognize a scanned product, as happens with unfortunate regularity, the customer may have to wait for a store employee to resolve the problem.

Many shoppers view a lack of support staff, long lines, difficulty in finding the physical locations of products, and tedious and possibly error-prone check-out procedures as obstacles to doing business with brick-and-mortar retailers. Consumers have responded by directing an increasingly large fraction of their purchases to on-line retailers, where a customer need not waste time travelling to a store, finding the physical location of an item in the store, or standing in a check-out line. Brick-and-mortar stores need to find ways to deliver a more personalized shopping experience to retain customers, improve shopper satisfaction while visiting a store, and compete against online retailers.

SUMMARY

An example of an apparatus embodiment includes a personal shopping assistant (PSA) and a PSA dock configured for removable attachment of the PSA to a shopping container. The example of a PSA includes a processor; a flat panel display; a product code reader; a first video camera positioned to view essentially all of the space for carrying items in a basket of a shopping container; an optional second video camera positioned to view a person interacting with the PSA and optionally objects in the vicinity of the shopping container; and a motion detector positioned to detect an item placed into the shopping container. The flat panel display, the product code reader, the first video camera, the optional second video camera, and the motion detector are connected for data communication with the processor.

An example of a method embodiment of using a PSA embodiment to improve a customer's shopping experience may include attaching the PSA to a shopping container; detecting with the PSA a placement of the product in the shopping container; scanning an identification code for the product with a product code reader on the PSA; and storing in the PSA an inventory of items placed in the shopping container.

DESCRIPTION

Figure 1:
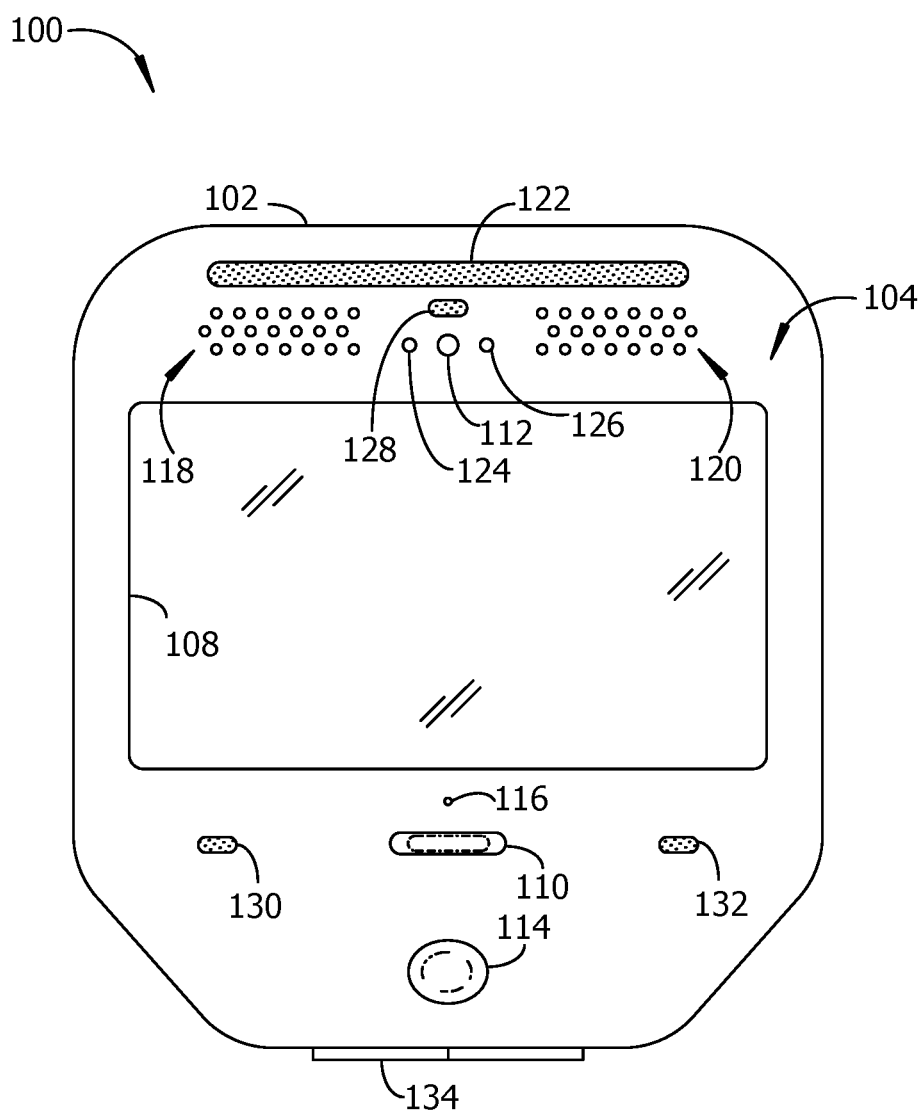
FIG. 1 is a view toward a front side of an example apparatus embodiment of a personal shopping assistant (PSA).

A portable data terminal referred to herein as a Personal Shopping Assistant (PSA) provides a convenient, secure, and easy-to-operate information display device for providing a personalized shopping experience to customers visiting a store. The PSA may present customer-specific information about product recommendations, product availability, price, performance features, discounts, promotions, and product location in the store to individually identified customers who might otherwise have difficulty obtaining such information while visiting the store. Manufacturers or distributors who supply products to a store may have their information presented preferentially over information from other manufacturers or distributors, possibly when a customer is standing near the product's display location in the store, and possibly when the manufacturer or distributor offers a discount to the store or pays a fee to the store. Information presented by the PSA may be modified according to a customer's previous shopping history and experiences, product reviews, product promotions, alternative product offerings that might meet the customer's needs, customer preferences, membership in a supported organization or group, membership in a store discount club, and possibly other reasons. If the PSA and the databases the PSA accesses do not solve the customer's needs, the PSA may optionally be configured for voice over internet protocol (VOIP) audio and/or video calls between the customer and a customer support representative who may give additional suggestions or guidance to the customer.

While a customer is shopping in a store, the PSA detects and identifies items placed in a shopping container, forming and storing an accurate inventory of the items placed in the shopping container. Should an item be placed in the cart in such a way that the PSA cannot identify the item, the PSA may display a message to the customer to scan the item with a product code reader on the PSA. When the customer has finished shopping, the inventory may be communicated from the PSA to an automated check-out station configured for quickly and accurately displaying a list of the items in the shopping container, individual item prices, and the total purchase price, and to collect payment from the customer with a debit card or credit card. Whereas manual check-out stations operated by cashiers and customer self-check-out stations in widespread use may require a customer or a cashier to individually scan items at the check-out station, a slow and frustrating process for many customers, an automated check-out station configured for communication with a PSA performs a rapid data transfer of the shopping cart inventory from the PSA to the supervisory control system in the store and processes payment promptly according to the transferred inventory, avoiding lengthy check-out delays and preventing long check-out lines from forming. However, should a customer elect to use a manual check-out line with a cashier, the inventory of the shopping cart's contents stored in the PSA may optionally be transmitted to the cashier's check-out station to reduce check-out time.

A PSA may be attached to a shopping container while a customer moves about in a store. An optional PSA dock on the shopping container provides a secure yet removable attachment of the PSA to the shopping container. Alternatively, the PSA may include a clip, clamp, or latch to enable removable attachment of the PSA to a shopping container, a PSA dock may be permanently attached to a shopping container, or a PSA dock may be an integrally formed part of the shopping container. When docked to the shopping container, the PSA is preferably positioned with a video camera on the PSA facing downward toward the shopping container with the camera's field of view covering essentially all of the space in the basket area of the shopping container. Any residual space in the basket not in the field of view of the first video camera will preferably be too small to hold a product undetectable by the camera. An optional second video camera on the PSA may be positioned to record the face of the customer carrying or pushing the shopping container, possibly to enable a video VOIP call to be made from the PSA, and optionally to permit facial recognition software to identity a person in the camera's field of view.

Examples of a shopping container suitable for use with the disclosed PSA embodiments include shopping carts with a basket and wheels, such as a cart intended to be pushed or pulled by a person, and hand-carried shopping baskets. Shopping carts and shopping baskets may be fabricated from welded wire, from metal tubing, from molded polymer material, from sheet metal, and from combinations of these materials. Shopping carts generally have from two to four wheels, depending on the size of the cart and the size of the store aisles the cart is intended to negotiate.

A store as used herein refers to a physical location of a business establishment where goods are available for sale. Examples of a store include, but are not limited to, a supermarket, a furniture store, a dry goods store, a building supply store, a home improvements store, a lumberyard, a garden center, a plant nursery, a convenience store, a hobby or crafts store, a department store, a beverage store, and others. Embodiments are particularly advantageous in large retail and/or wholesale stores stocking many different products at one facility, but small retail stores may also benefit from use of the apparatus and methods disclosed herein. The physical location of a business establishment available to be visited by prospective customers may be referred to as a "brick-and-mortar" store to distinguish from on-line businesses offering products through web pages and/or email services available on the Internet.

A store may place related products near one another at assigned locations and display signs or other information so customers can locate items of interest. Examples of information describing a location of a product in a store include, but are not limited to, an aisle number, a side of an aisle (e.g. left side or right side), a shelf number, a bin number, a rack number, a department number, or other identifying information about spatial locations in a store. Location may optionally be implied from reading one, and optionally more than one, product code from a product on a shelf. Reading more than one product code may reduce a location error caused by a misshelved or incorrectly labeled product.

Figure 2:
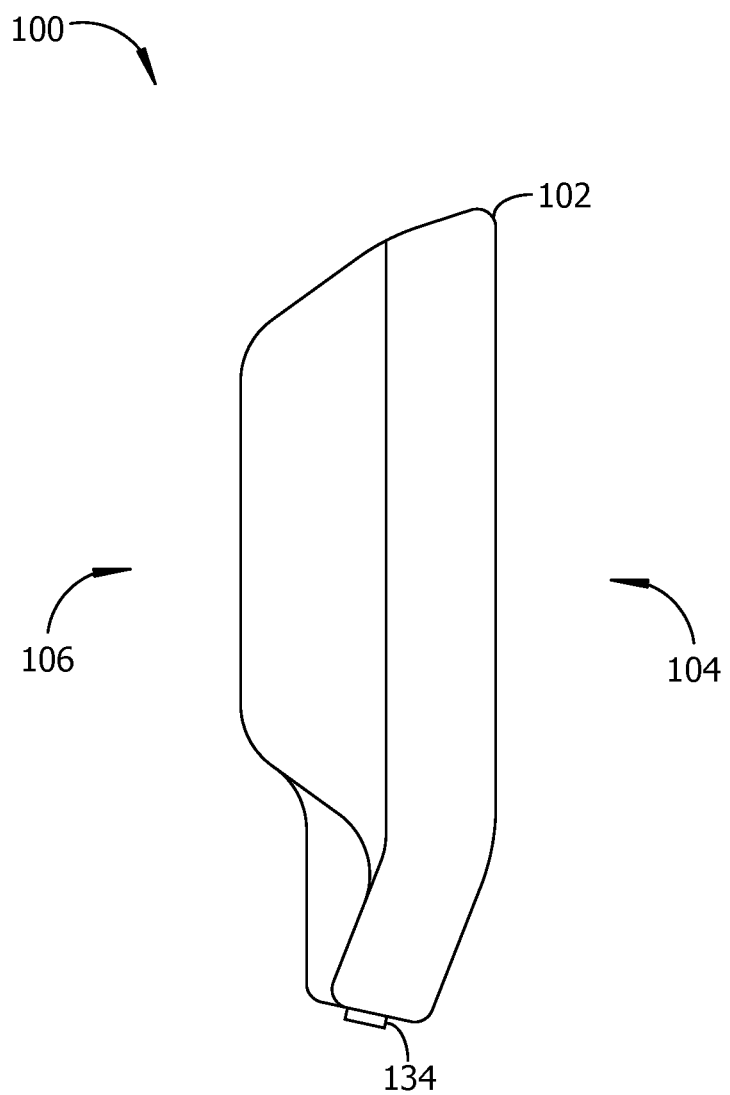
FIG. 2 is a view toward a left side of the example of a PSA of FIG. 1.

FIG. 1 shows an example of an apparatus embodiment of a Personal Shopping Assistant (PSA). The example of a PSA 100 is shown in a view toward a front side 104 of an outer enclosure 102 in FIG. 1 and toward a left side of the enclosure in FIG. 2. The front side 104 is the side that will preferably face toward a person pushing or carrying a shopping container to which the PSA has been attached. Components on the front side 104 of the enclosure 102 include an optional flat panel display 108, a product code reader 110, an optional upper video camera 112, a lower video camera 114, a light bar 122, and one or more status lights (124, 126). Other components on the front side 104 of the enclosure 102 include a left speaker 118, a right speaker 120, and a microphone 116. The light bar 122, a first optional status light 124, and a second optional status light 126 may be provided for indicating alarm and status conditions of the PSA 100. An optional access panel (not shown) on the back side 106 of the enclosure 102 may be provided to replace a battery and possibly other components inside the enclosure.

The flat panel display 108 may be a color or monochrome graphic display or alphanumeric display. Examples of a flat panel display 108 include, but are not limited to, a liquid crystal display (LCD), a light emitting diode (LED) display, and an organic LED (OLED) display. The flat panel display and other components in the PSA are preferably capable of operating for at least the duration of an average shopping trip in the store where the PSA will be used, possibly a few hours, from a battery or other electric power storage device inside the PSA.

In an alternative embodiment, a PSA may omit a flat panel display. A PSA without a flat panel display may optionally establish a short-range data connection to a smart phone in a customer's possession, using the smart phone's display to present information from the PSA, and optionally using the microphone and speaker in the smart phone to receive voice commands for the PSA and send audible messages and alarms to the smart phone.

The product code reader 110 may be positioned to face downward toward the basket area of a shopping container. The product code reader is circuitry configured to read a product code. The product code reader may be an optical reader capable of reading any one or more of a linear bar code, sometimes referred to as a "1D" barcode, and a matrix barcode, sometimes referred to as a "2D" barcode. The product code reader 110 may alternately be a Radio Frequency Identification (RFID) reader, or may include readers for bar codes and RFID codes.

An optional card reader for a debit card, credit card, a membership card, or other card with an identity chip, and/or magnetic stripe may be included on some embodiments of a PSA. The product code reader 110 may be used to read a 1D barcode, 2D barcode, and/or RFID code on a card equipped with such codes.

The optional upper video camera 112 may be positioned to view a customer's face for conducting a video VOIP call. The upper video camera 112 may optionally be used by the PSA or a supervisory control system in data communication with the PSA to perform identification of a shopper's location in a store and/or to perform facial recognition of the shopper using the PSA.

The lower video camera 114 is preferably positioned to record objects placed in the basket area of the shopping container. Camera images from the lower video camera 114 may be analyzed by a processor in the PSA 100 to detect when a product is placed in or removed from the basket area or folding shelf area of a shopping cart. Camera images may further be analyzed to count a number of items in the cart and optionally to identify a specific type or alternatively a category of each item in the cart.

The microphone 116 may be provided for the PSA to accept voice commands from a customer and optionally for the customer to conduct a VOIP call from the PSA. Examples of voice commands include, but are not limited to, a request for information about a product's location in the store, an inquiry about product inventory, price, or features, an instruction that shopping has been completed, a request for assistance from a store employee, a request to place a VOIP call, and so on. The PSA may issue audible messages and/or alarms through a first speaker 118 and an optional second speaker 120. Messages and alarms may have been received by the PSA from an external supervisory control system or may have been retrieved from memory in the PSA. The speakers, microphone, and optional upper video camera may be used to make an audio and/or video VOIP call to a customer service representative for the store or to a representative of a product manufacturer.

An optional light bar 122 and one or more optional status lights (124, 126) may be provided to attract a shopper's attention to the PSA, to indicate an operating status of the PSA, to display an alarm condition, or for other reasons. The light bar 122 may be implemented as a plurality of LEDs, a vacuum fluorescent display, an electroluminescent display, or other displays with individually addressable elements to permit selected sections of the light bar to be illuminated and deactivated. The light bar 122 may be controlled to indicate any one or more of the example conditions listed in Table 1.

TABLE 1

Example Light Bar Illumination Patterns

| Action | Example of a Corresponding Lighting Pattern |
| --- | --- |
| PSA startup and/or system reset | left to right scroll or right to left scroll of illuminated block or segment |
| Startup complete | solid bar pattern, all light emitting elements illuminated |
| Detection of item being placed in shopping container | Bar blinks at end of light bar on same side of shopping container as the item entered the shopping container |
| A scanned item has been added to the inventory list in PSA | Solid bar flashes one time |
| An item in the shopping cart is picked up by the shopper | Middle segment of light bar blinks; blinking section may move in the same direction (left or right) that the item was displaced |
| An item in the shopping cart is removed from the cart | All light bar elements flash in unison once |
| Shopper issues voice commands to PSA (audio recording and voice recognition active) | All light bar elements flash slowly in unison while recording is active |
| Device response to a recognized audio command | All light bar elements flash slowly in unison |
| User alert or alarm, e.g. PSA outside geofence boundary, low battery power, command not recognized, system error | All light bar elements flash rapidly in unison until alarm condition terminates |

Different colors may optionally be assigned to the various illumination patterns describe in the examples listed in Table 1.

One or more optional status indicators (124, 126), which may be implemented as discrete LEDs or as symbols to be presented on the flat panel display 108, may be activated in various flashing and steady-illumination patterns to indicate the PSA is busy, battery power is low, communications with the supervisory control system are active (or alternately have failed), the PSA is within the geofence boundary (or alternately, outside the boundary), an item placed in the cart has not been identified, a voice command was not recognized, and so on.

An input/output connector 134 on the PSA 100 may be provided to establish wired communications between a PSA 100 and a supervisory control system, for example when the PSA is placed in a PSA dispensing station. An internal battery in the PSA 100 may be recharged by power passing through the connector 134. Data from the supervisory control system may be downloaded into the PSA through the connector, and data from the PSA may be uploaded to the supervisory control system through the connector 134. Data may alternatively be uploaded and downloaded through a wireless communications interface in the PSA 100 to the supervisory control system, an automated check-out station, a manual check-out station, and possibly other devices such as a product weighing station, bulk product dispenser, and so on.

One or more motion detectors on the PSA may be used to determine that an item has placed in the shopping container, an item has been removed from the shopping container, and optionally the direction in which the item was moved into or out of the shopping container. For example, when an upper motion detector 128 outputs a motion detected signal before either a left motion detector 130 or a right motion detector 132 output their respective motion detected signals, then the PSA may record that an item has been placed into the shopping container from above. When the right motion detector 132 outputs a detected motion signal before the left motion detector 130, the PSA may determine that an item has been displaced into or away from the right side of the shopping container. When the left motion detector 130 outputs a detected motion signal before the right motion detector 132, the PSA may determine that an item has been displaced into or away from the left side of the shopping container. When either of the left or right motion detector output a motion detected signal before the upper motion detector, the PSA may determine that an item has been moved in an upward direction, possibly indicating that an item in the cart has been picked up. Each of the motion detectors (128, 130, 132) may be positioned on the PSA 100 to detect an item being placed into any part of the product basket 202 and optionally on the folding platform 204. Illumination patterns presented by the light bar 122 may indicate these movements as suggested in Table 1.

Figure 3:
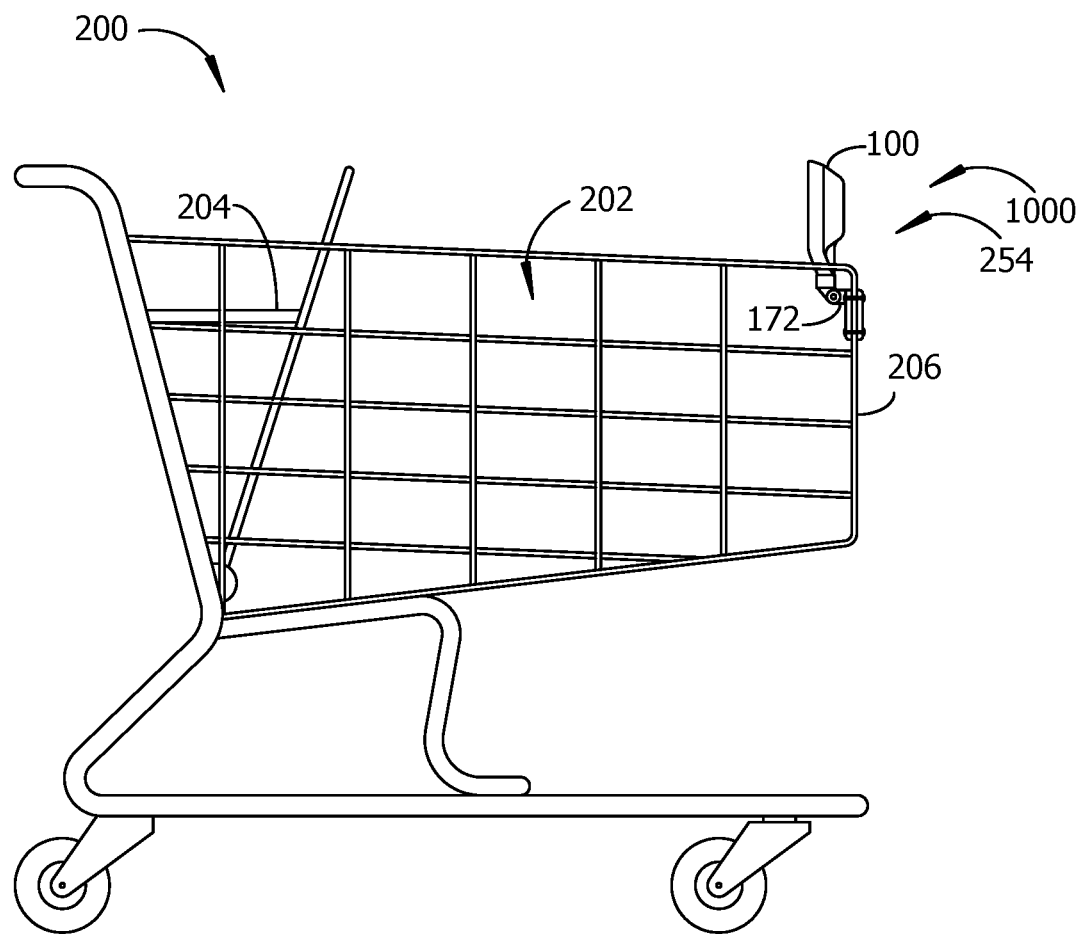
FIG. 3 shows an example of a PSA connected to a PSA dock attached to a shopping cart.
Figure 4:
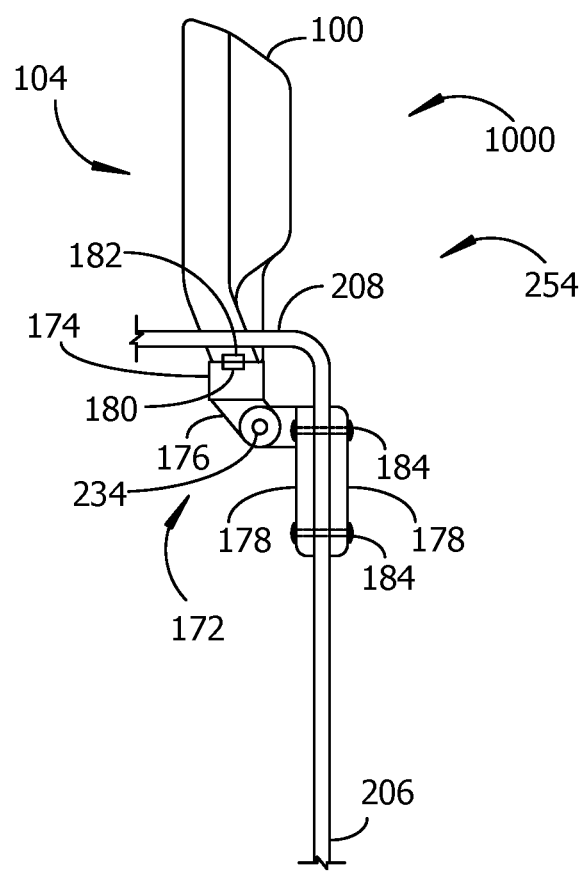
FIG. 4 shows a partial enlarged view of the examples of a PSA, PSA dock, and shopping cart of FIG. 3.

FIGS. 3 and 4 show an example apparatus embodiment 1000 including a PSA 100 connected to a PSA dock 172. The apparatus 1000 is attached to an example of a shopping cart 200. The shopping cart 200, an example of a shopping container, may include a product basket 202 and a folding platform 204. In some shopping carts, the folding platform 204 may be used as a seat for a small child. An example PSA dock 172 may be securely attached to a side wall 206 of the shopping container 200, preferably with the front side 104 of the PSA 100 facing toward the rear of the cart as suggested in the figures. Alternatively, the PSA dock may be part of the PSA. In the example of FIGS. 3 and 4, the PSA dock 172 may be positioned with all parts of the PSA dock below a top edge 208 of the product basket 202 to avoid damage to the PSA dock when the front of the shopping cart is pushed through the folding back panel of another shopping cart, for example to nest the carts together for storage.

Examples of some additional features of the apparatus embodiment 1000 including the PSA 100 and PSA dock 172 are shown in FIG. 4. The example PSA dock 172 may optionally include a clamp plate 178 or a pair of opposing clamp plates 178 arranged to be held to interior and exterior surfaces of the side wall 206 on a shopping container 200 by clamp fasteners 184. A support arm 176 attaches to the clamp plate inside the basket 202 of the shopping container 200. The support arm 176 may optionally include a pivot 234 to set and/or adjust a viewing angle of the PSA. The support arm 176 may terminate at its upper end in a PSA receptacle 174. The support arm may optionally be formed as an integral part of a shopping container. Alternatively, the support arm may be strongly attached to or formed as an integral part of the PSA 100, with a clamp (not shown) for attachment to the shopping container.

The PSA receptacle 174 may be arranged to receive the I/O connector 134 and possibly other parts on the bottom side of the PSA enclosure 102. The PSA receptacle 174 may optionally include a magnetic latch 180 positioned to magnetically engage with a corresponding magnetic latch 182 in the PSA 100. The coupled magnetic latches hold the PSA 100 securely to the PSA receptacle 174, yet allow the PSA to detach without damage if the front of the cart or the PSA collides with another object, for example if the PSA is inadvertently left in place on the PSA receptacle when the front end of the shopping cart 200 is pushed into the back end of another shopping cart to nest the two carts together. In some embodiments 1000, the PSA 100 may detect the presence or absence of the magnetic latch 180 to determine if the PSA is connected to a PSA dock 172 or a PSA dispensing station 216.

Figure 5:
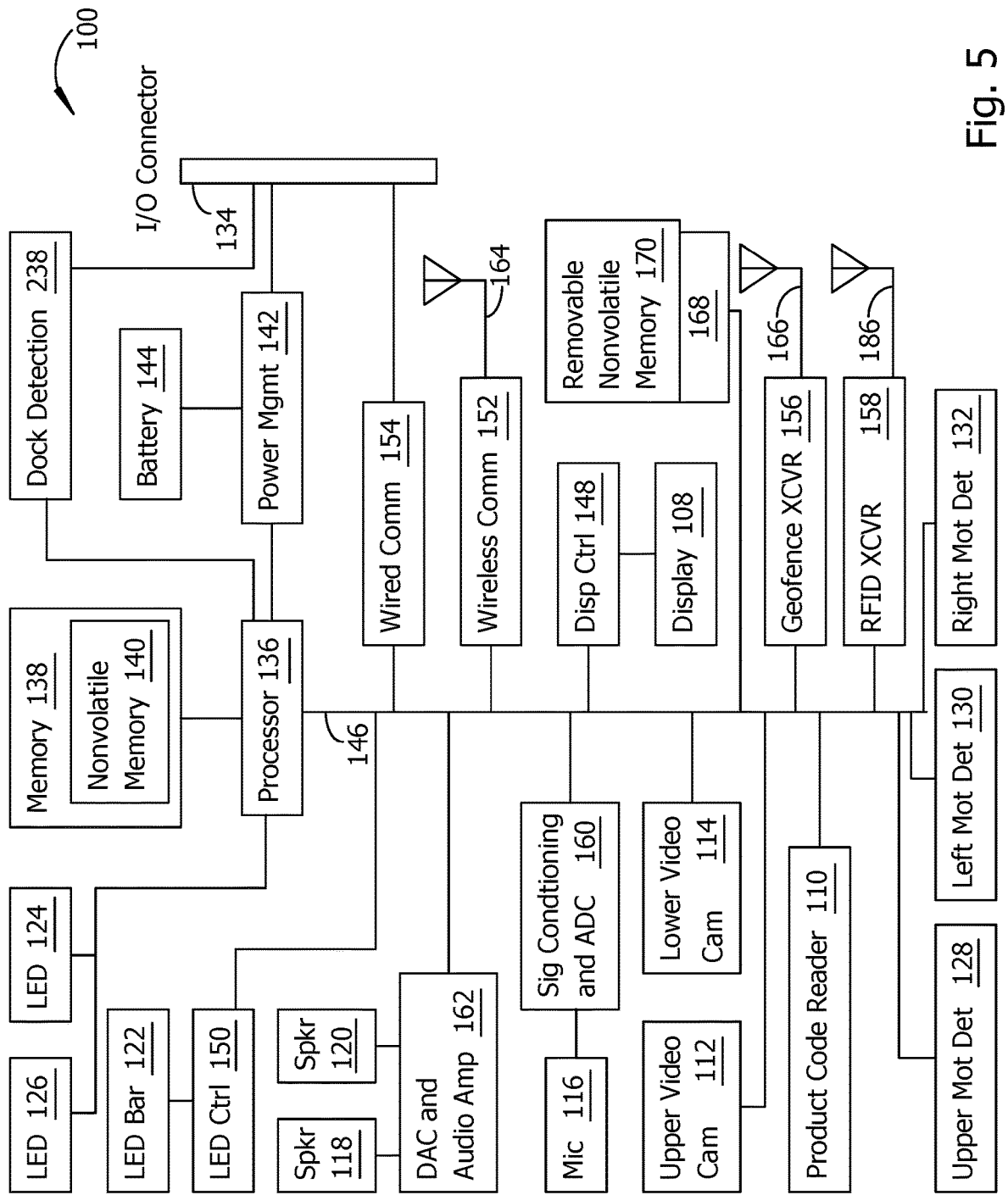
FIG. 5 is a block diagram of some components and electrical connections included with an example PSA embodiment.

A PSA 100 may include the examples of components and electrical connections shown in the block diagram of FIG. 5. The PSA 100 includes a processor 136 implemented as semiconductor hardware, for example a microprocessor (MPU) 136, for managing and directing PSA operations and communicating with other systems in the store. The processor and other parts of the PSA receive electrical power from a power management circuit 142 coupled to the I/O connector 134 and a battery 144. Power for recharging the battery is coupled through the I/O connector 134, for example when the PSA 100 is connected to a PSA dispensing station 216 as will be discussed with regard to FIG. 10. The power management circuit 142 may include a battery charger and a battery charge status monitor. Battery charge status may be reported to the processor 136.

Alternative embodiments of a PSA 100 may implement the processor 136 with hardware including, but not limited to, any one or more of a microprocessor (MPU), a microcontroller (MCU), a multi-chip module, an application-specific integrated circuit (ASIC), and a field programmable gate array (FPGA). In some embodiments of a PSA 100, some of the peripherals shown in FIG. 5 may be included in the processor, for example, but not limited to, a digital-to-analog converter (DAC), an analog-to-digital converter (ADC), a wired communications interface controller, for example a serial communications controller, a parallel communications port controller, or an Ethernet controller, a wireless communications interface, for example a Wi-Fi communications controller, an infrared data association (IrDA) controller, or a Bluetooth™ controller, a display controller, an audio amplifier, and a product code reader. Wireless communications may be implemented in accord with any of several well-established short-range and/or long-range wireless communications standards for local area networks, WiFi communications, low-data-rate radio frequency networks, and the like.

Data and commands needed by the processor 136 may be stored in a local solid state memory 138, a portion of which may be nonvolatile memory 140. Data and commands may be exchanged between the processor 136 and external systems through a wired communications interface 154 coupled to the I/O connector 134 and/or through a wireless communications controller 152 coupled to a radio frequency (RF) antenna 164. The wired communications interface 154 and the wireless communications controller 152 may be connected for data communication with the processor 136 through a data and command bus 146. Other components optionally coupled to the processor 136 through the data and command bus 146 include a display controller 148 for sending display data to the flat panel display 108, an LED controller 150 for operating the light patterns produced by the light bar 122, and a DAC and audio amplifier circuit 162 for driving a first speaker 118 and an optional second speaker 120. Other components in the PSA 100 optionally connected to MPU 136 through the data and command bus 146 include signal conditioning and ADC circuitry 160 for the microphone 116, the optional upper video camera 112, the lower video camera 114, and the product code reader 110.

The upper motion detector 128, optional left motion detector 130, and optional right motion detector 132 may each output a detected motion signal to the MPU over the data and command bus 146 upon detection of motion within each sensor's field of view. An optional RFID transceiver 158 may transmit unique identifying information assigned to each specific PSA 100 over an RF antenna 186. Failure of a supervisory control system to receive an RFID signal from a PSA may be an indication that the PSA has been moved outside the limits of a geofence boundary. Alternatively, an interruption in a wireless communication signal by the wireless communications controller 152 may indicate that the PSA 100 has been moved outside a geofence boundary.

Figure 10:
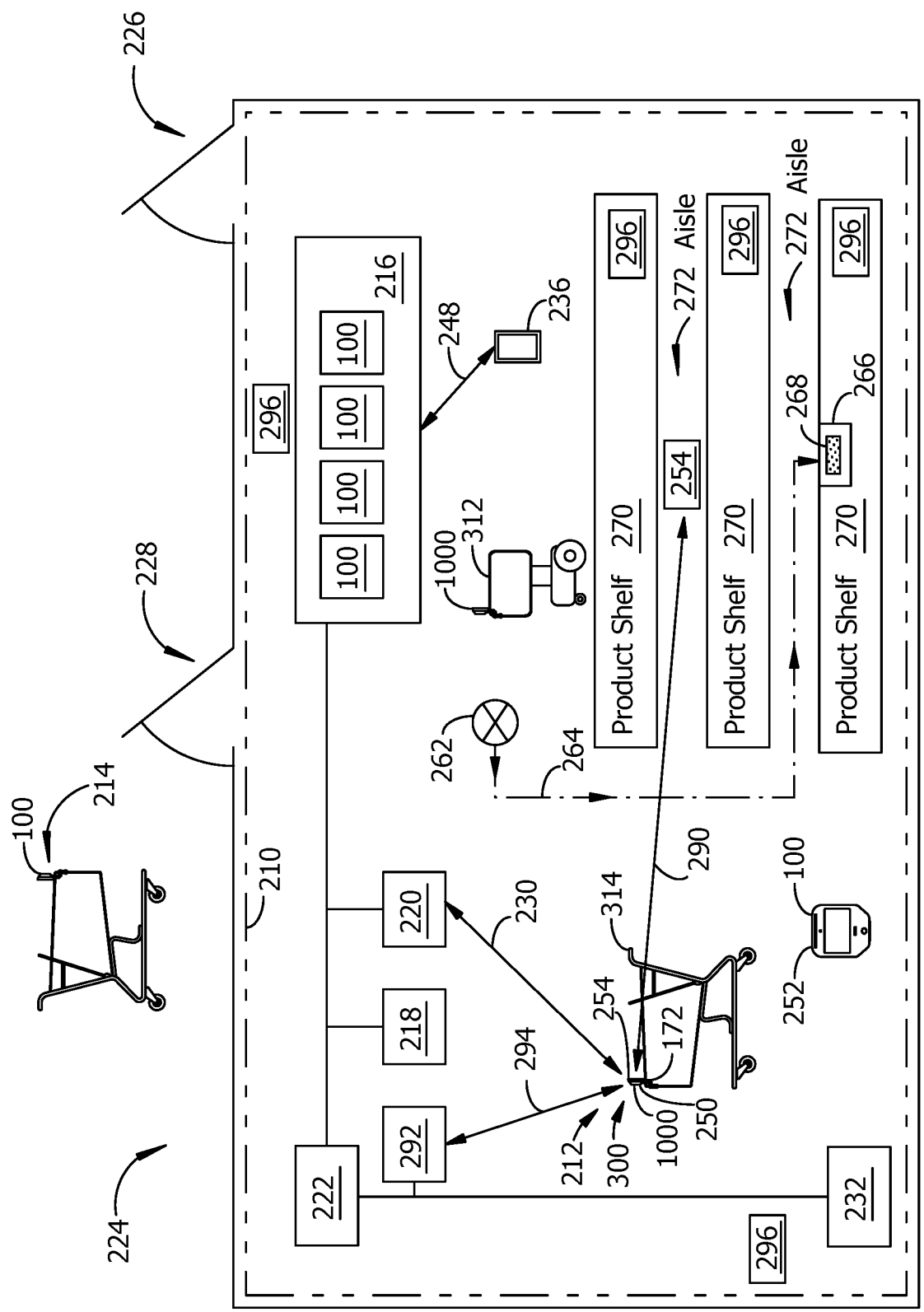
FIG. 10 shows an example of a PSA operating at a store having a PSA dispensing station and a geofence boundary.

A geofence transceiver 156 and another antenna 166 may optionally be included in a PSA 100. The geofence transceiver 156 may communicate with a corresponding geofence transceiver 232 in a store (ref. FIG. 10) to determine if the PSA 100 is inside or outside a geofence boundary 210. The geofence transceiver 232 may transmit location-related messages and/or signals from a single location in the store. Alternatively, more than one, and optionally many, beacon transmitters 296 may be positioned throughout a store, each beacon transmitter sending location-related messages and/or signals. The PSA 100 may determine an accurate position in the store by a signal and/or message received from the geofence transceiver 232 or from one or more of the beacon transmitters 296.

The MCU 136 may assert an alarm indication when the PSA is determined to be operating outside the geofence boundary, a message may optionally be displayed on the PSA and possibly sent to the customer's cellular telephone. The message may optionally include a request for the customer to return the PSA 100 to the PSA dispensing station 216 or to return to an area of the store authorized for customer access, perhaps an area within a geofence limit detectable by the PSA. The supervisory control system 222 may transmit a message to a PSA 100 determined to be outside the geofence boundary, and may optionally send a text message requesting check-in of the PSA to the cellular phone of the customer who most recently checked out the PSA.

An electrical connector 168 for a removable nonvolatile memory 170 may be connected to the data and command bus 146. A removable nonvolatile memory 170 may be used to provide updates for PSA operating software, network access configuration and/or authorization, advertising content, customer-specific greetings, alarm messages, error messages, and so on. Examples of a removable nonvolatile memory 170 include, but are not limited to, a USB stick, a microSD card, an SD card, an SDHC card, and a CompactFlash card.

An embodiment 1000 including a PSA 100 configured for connection to a PSA dock 172 may include an optional dock detection circuit electrically connected to the processor 136. The dock detection circuit 238 outputs a dock connected signal to the MPU when the PSA 100 is mechanically, and optionally electrically, connected to a PSA dock 172 or a PSA dispensing station 216. The dock detection circuit 238 may alternatively output a dock absent signal to the processor 136 when a connection to a PSA dock or a PSA dispensing station is not detected. The processor 136 may be configured to disable some of the operational features of a PSA 100 when a connection to a PSA dock or PSA dispensing station is not detected.

Figure 6:
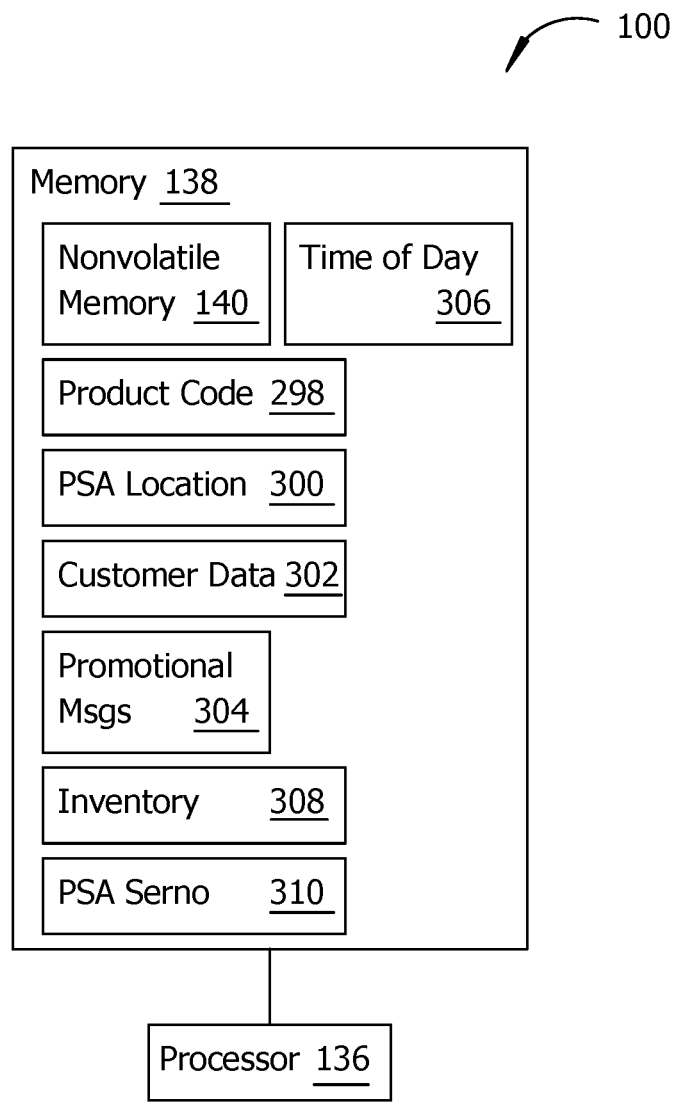
FIG. 6 is a block diagram showing examples of some parameters which may be stored in a PSA memory.

FIG. 6 shows examples of some parameters which may be stored in the memory 138 of the PSA 100. Examples of data which may be stored in the memory 138 include, but are not limited to, time of day 306, for example current time of day or a time of day when a specified action is to occur, a product code 298, a PSA location 300, customer data 302, promotional messages 304, an inventory list 308 of items in the shopping container, and a PSA serial number (serno) 310. Customer data 302 may include information needed for identifying a specific person who has checked out the PSA, for example name, address, customer identification number, and so on. The PSA serial number may be any unique alphanumeric information assigned to each PSA. Examples of promotional messages include, but are not limited to, discount coupons, greeting messages, thank-you messages, advertising, and other sales- and marketing-related communications, and may be in the form of videos, photographs, and/or text. The content of a promotional message may optionally be composed for presentation to a specific identified customer and/or an identified group of customers.

Figure 7:
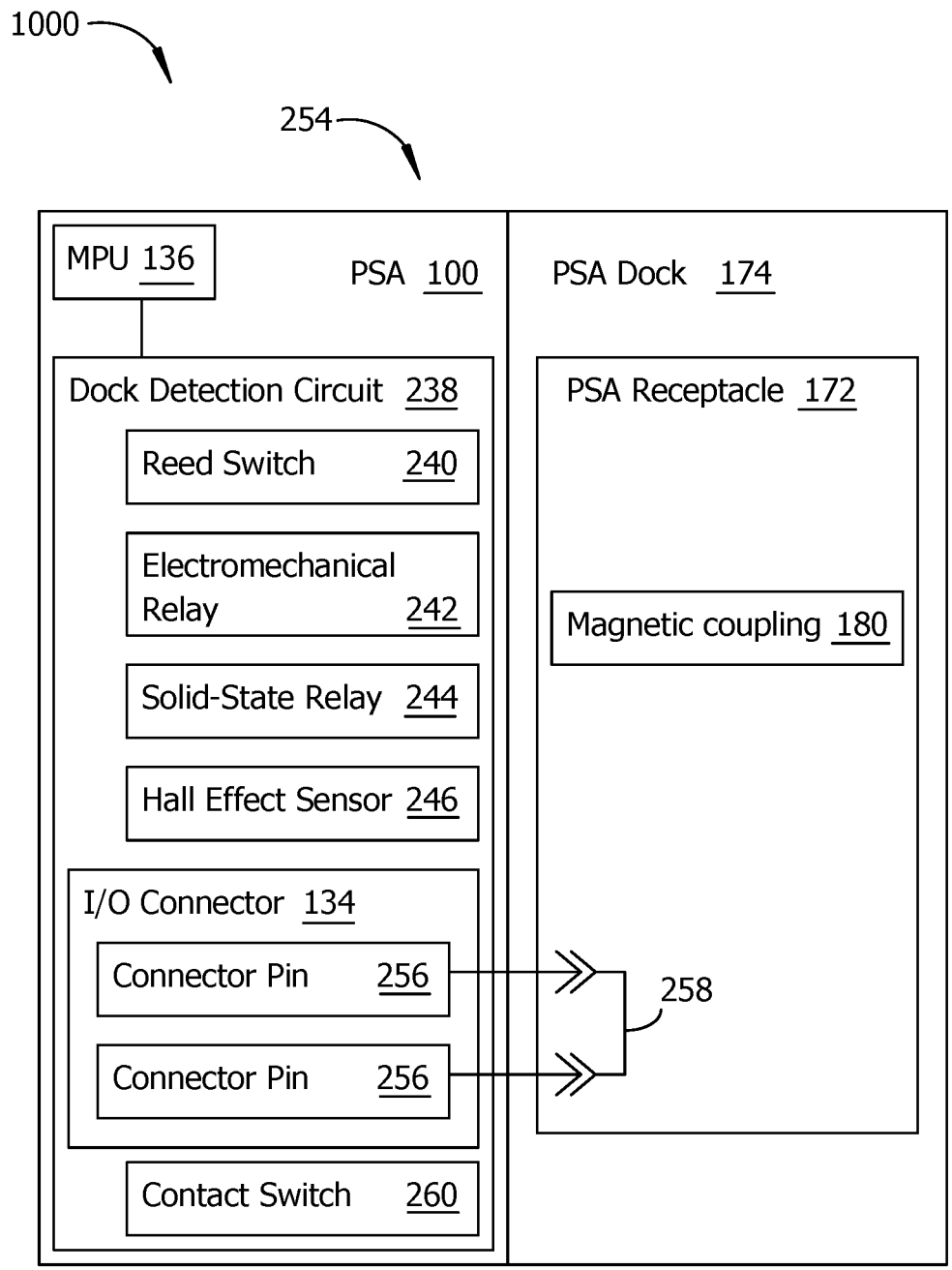
FIG. 7 is a block diagram of some components optionally included in the dock detection circuit of FIG. 5.

FIG. 7 is a block diagram illustrating some alternative implementations of the optional dock detection circuit 238. FIG. 7 further shows an example 254 of a PSA 100 connected mechanically, and optionally electrically, to a PSA receptacle 172 on a PSA dock 174. The dock detection circuit 238 may include any one or more of a reed switch 240, an electromechanical relay 242, a solid state relay 244, and a hall effect sensor 246, any of which may form the dock connected signal by close proximity to the magnetic coupling 180 in the PSA receptacle 172 and which may optionally form a dock absent signal when the dock detection circuit 238 is moved beyond a maximum sensing range for the PSA dock, for example by removing the PSA 100 from the PSA dock. The dock detection circuit 238 may alternatively be implemented as two or more connector pins 256 in the I/O connector 134 or as a contact switch 260. The connector pins 256 may be electrically connected to one another by a jumper 258 in the PSA receptacle 172 when the PSA 100 is connected to the PSA dock 174. Removing the PSA from the PSA dock may disconnect the jumper from the connector pins, which may cause the processor 136 to detect the absence of a PSA dock. Or, the optional contact 260 switch may activate when a pin or lever on the switch is displaced by contact with part of the PSA dock 174. A PSA dispensing station 216 may optionally be configured similarly to the PSA dock 174 in the example of FIG. 7 to enable the PSA 100 to use a same detection circuit 238 for sensing connection to the PSA dock or the PSA dispensing station.

Figure 8:
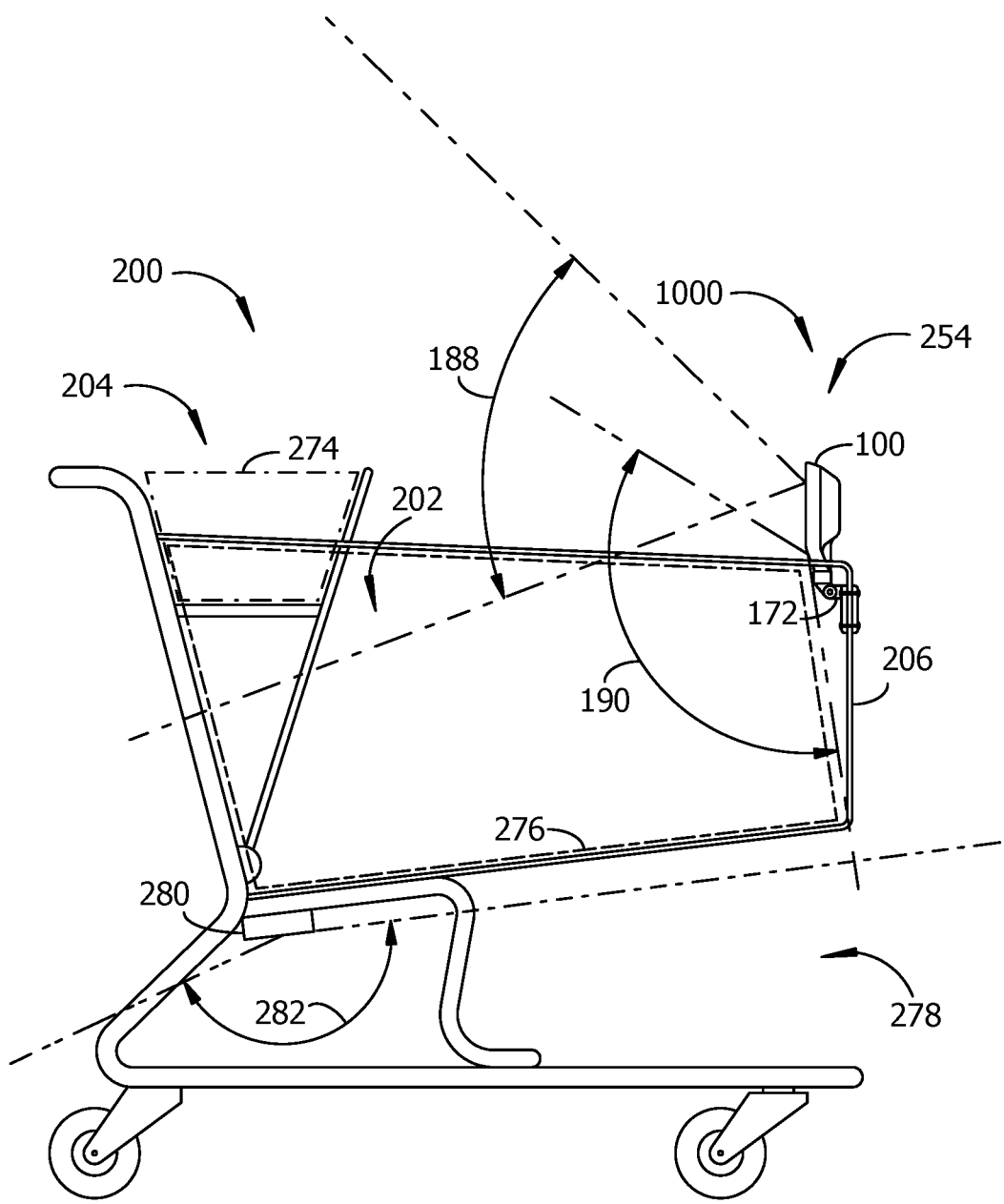
FIG. 8 shows examples of a PSA connected to a PSA dock attached to a shopping cart, further illustrating examples of viewing angles for the lower video camera and optional upper video camera on the PSA.

FIG. 8 illustrates examples of viewing angles for the lower video camera and optional upper video camera in an apparatus embodiment 1000 represented by an example 254 of a PSA 100 connected to a PSA dock 172. The example PSA dock 172 may be attached to the front panel 206 of a product basket 202 on a shopping cart 200. The optional upper video camera may have an angular field of view 188 in a vertical plane of about 65 degrees, a range sufficient to record the faces of most persons standing at the back of the cart or pushing the cart while seated in a wheelchair or electric scooter. The angular field of view and resolution of the upper video camera 112 may be selected to read aisle numbers, bin numbers, product codes, or other location information in the vicinity of a PSA 100 being moved through a store, any one or more of the examples of location information possibly used by the PSA to determine the PSA's location in the store. The field of view 188 of the upper camera may optionally be selected to record items placed on the folding platform 204 in the shopping cart. The lower video camera 114 may have an angular field of view 190 in a vertical plane of about 130 degrees, a range sufficient to view essentially all of the interior volume of the shopping basket 202, optionally including items place on the folding platform 204.

The field of view 190 of the lower camera 114 may be substantially larger than needed to view the contents in the basket 202 of the shopping cart 202. An upper region of interest 274 above the folding platform 204 and a lower region of interest 276 representing space within the basket 202 may be defined by selectively monitoring and analyzing a subset of the pixels in the image sensor of the lower camera. The lower region of interest and upper region of interest may optionally overlap one another, or may alternatively be defined to be non-overlapping volumes. The subset of pixel rows and columns in camera images to be monitored for each region of interest may be determined from the image scale for the sensor in the lower video camera using pixel row and column counts and pixel dimensions in the camera's image sensor and the focal length of the camera's lens, according to conventional calculations for mapping a digital image sensor's field of view onto a real-world scene.

An optional under-cart product detector 280 may be attached to a shopping cart 200 to detect items placed on a rack or shelf in an under-cart region 278. The under-cart product detector 280 may communicate with the PSA 100 on the cart 200 by a wireless communications link. Communication with the PSA 100 may be initiated by the under-cart product detector when a processor in the under-cart product detector determines from a camera image or motion detector signal that an item has been placed in the under-cart region. Alternatively, the PSA 100 may poll the under-cart product detector 280 to request an item detection status. The PSA 100 may optionally display a request to scan a product code on an item under the cart with the product code reader 110 on the PSA when the PSA 100 is otherwise unable to identify the item. The field of view 282 of a camera and/or motion detector in the under-cart product detector 280 may be arranged to detect items placed anywhere in the under-cart region 278, and may optionally determine from which direction the items entered the under-cart region.

Figure 9:
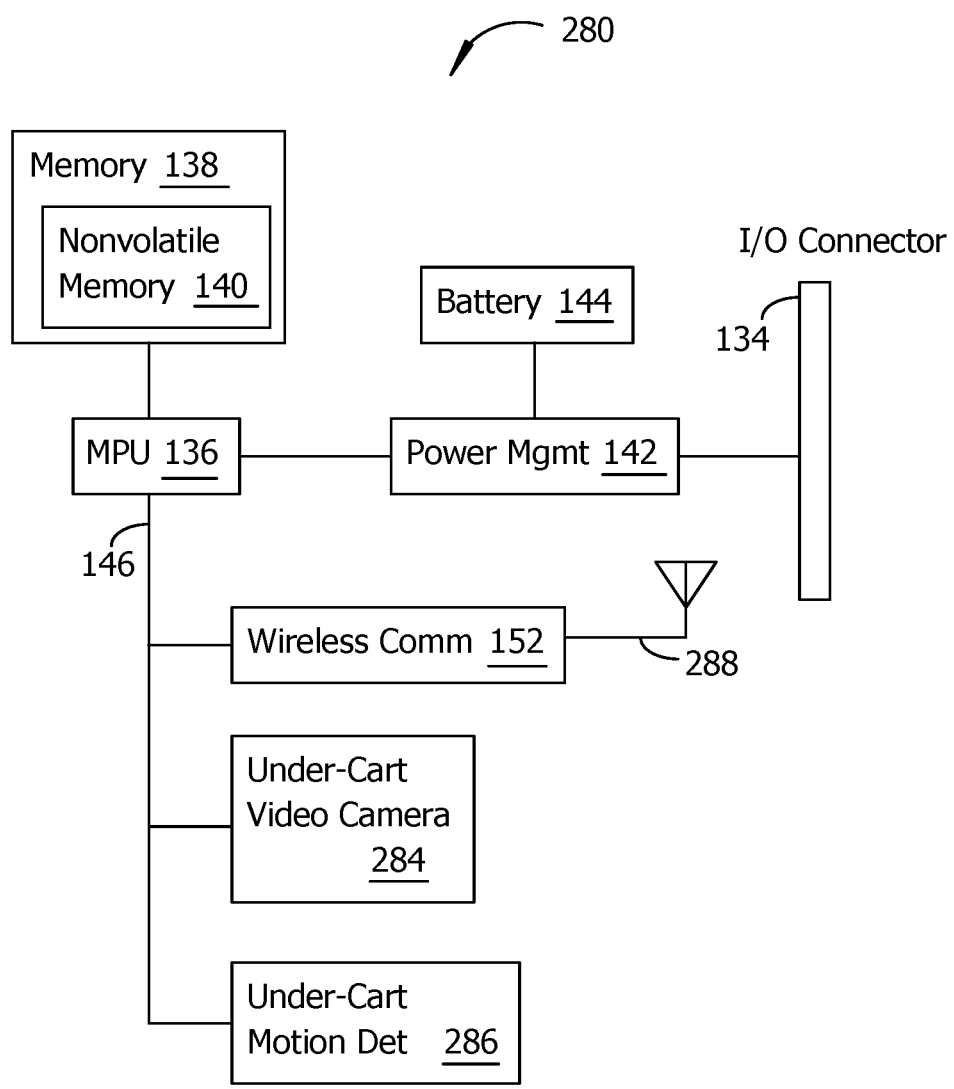
FIG. 9 is a block diagram of components and electrical connections in an example of an optional under-cart product detector.

FIG. 9 is a block diagram of an example under-cart product detector 280. The under-cart product detector 280 may include a controller implemented as semiconductor hardware, for example a microprocessor (MPU) 136. The controller may be configured for recording video images and motion capture signals, analyzing video images and motion capture signals to detect an item being placed in the under-cart region, and communicating with a PSA 100. The MPU and other parts of the under-cart product detector 280 may receive electrical power from a power management circuit 142 coupled to an I/O connector 134 and a battery 144. Power for recharging the battery may be coupled through the I/O connector 134. An under-cart product detector may be connected for data communications with a PSA 100 by a wireless communications transceiver 152 and an antenna 288. Alternatively, data and power connections to a PSA may be made through wired connections. The power management circuit 142 may include a battery charger and a battery charge status monitor. Battery charge status may be reported to the processor 136 and may optionally be communicated to a PSA 100. In some embodiments 1000, an under-cart product detector 280 may be an integrally-formed part of a PSA 100, with all parts of the PSA and under-cart product detector protected in a single outer enclosure configured to be attached to a shopping cart.

An optional under-cart video camera 284 and an optional under-cart motion detector 286 may be positioned to detect an item being placed in the under-cart region. The under-cart video camera 284 and under-cart motion detector 286 may be connected for data communication with the processor 136 over a data and command bus 146.

FIG. 10 shows an example of an example embodiment 1000 operating in a store 224. A group of PSAs 100 available for customer check-out may be held on a PSA dispensing station 216 positioned near an entrance 226 and/or an exit 228. More than one station 216 may be provided when the entrance and exit are not close to one another, for example one station for customer check-out of a PSA and another station for customer return and check-in of a PSA after shopping is finished. The PSA dispensing station 216 may be connected for data communication with a supervisory control system 222. The PSA dispensing station 216 may optionally include a keyboard, display with touchscreen, microphone for accepting voice commands, or other means for accepting input information form a customer seeking to check out a PSA.

A customer may check out a PSA 100 with an applications program running on a smart phone 236. An application program on the smart phone 236 may communicate with the PSA dispensing station 216 over a local wireless link 248. The wireless link 248 may be a Wi-Fi network in the store or may be a short-range wireless communications channel to the PSA dispensing station 216. The application program running on the smart phone 236 may exchange identifying and security information with the PSA dispensing station 215 and/or supervisory control system 222.

Information submitted to enable dispensing a PSA to a specific, identified customer may include the store name, the customer's name, a unique security code and/or account number assigned to each customer, a password, a serial number or other unique code assigned to each PSA 100, and possibly other information. An application program on a customer's smart phone 236 may optionally be used to communicate a list of items of interest to the PSA so that the PSA may present the price and location in the store of each item and possibly to recommend alternative items.

The supervisory control system 222 may optionally receive data collected by a PSA 100 during a customer visit when the PSA is returned to the PSA dispensing station 216. The data transferred to the supervisory control system may be identifiable as having been obtained from a PSA checked out to a specific identified customer 250. The PSA dispensing station may log identifying information for a returned PSA and acknowledge to the customer that the unit has been checked in successfully. If a PSA is not checked in, the PSA dispensing station, or alternatively the supervisory control system, may examine check-out records to determine which customer checked out the PSA most recently.

In some embodiments 1000, a PSA 100 may optionally be checked out to a person without the person providing personal identifying information. For such an embodiment, the supervisory control system may check a PSA out and check it back in without attributing use of the PSA to a uniquely identified person.

In the example of FIG. 10, a cart inside the geofence boundary 210 shows an example 254 of a PSA connected to a PSA dock on a shopping cart. The example 254 further represents an example 250 of a PSA checked out to a specific identified customer, the customer previously having checked the PSA out from the PSA dispensing station 216. The checked-out PSA 250 may communicate with a wireless network 294 in the store 224 through a wireless network communications transceiver 292 in data communication with the supervisory control system 222.

Although the example geofence boundary 210 is shown in FIG. 10 as being inside the store 224, a geofence boundary may be arranged to include areas outside the store, for example a parking area near the store. The geofence boundary optionally represents a limit of an allowed operating area for customer use of a PSA.

When a PSA 100 is unable to communicate through the store's WiFi network 294, perhaps because the PSA is operating from a location in the store where signals from a transceiver 292 are too weak or too noisy for effective communications, the PSA may optionally seek communications with another PSA to form an ad hoc wireless communications network 290 for exchanging data between the blocked PSA and other store systems. The PSA may disengage from an ad hoc network when the PSA restores communications with the store's wireless network or when the PSA is returned to a PSA dispensing station. An ad hoc communications network may optionally be terminated when fewer than two PSAs are communicating with one another. In an alternative embodiment, an ad hoc wireless communications network comprising dynamic connections between at least two PSAs 100 operates in addition to, and optionally instead of, a local WiFi network using a network device such as a WiFi router.

The supervisory control system may optionally communicate over the wireless network 294 with each PSA 100 checked out by a customer and subsequently installed on a shopping container 200. The supervisory control system may, for example, capture information about products in the shopping container and may monitor whether the cart is inside a geofence boundary 210, as in the example of a first cart 212 or outside the geofence boundary as in the example of a second cart 214. Alternatively, each PSA 100 may operate essentially autonomously while the customer moves about the store, possibly without communicating with the supervisory control system 222. While operating autonomously, a PSA may optionally communicate with another system when, for example, an error is detected in the PSA or the communications network, the customer initiates a VOIP call from the PSA, the PSA is taken outside the store's geofence boundary, the customer indicates he or she is ready to check out, and possibly for other reasons. A PSA may be considered to be operating autonomously when the PSA executes an action without having previously received an instruction to perform the action or approval to perform the action from another PSA or a supervisory control system. A PSA operating autonomously may accept information from another device or from a person using the PSA before the processor in the PSA makes a decision to autonomously execute an action.

A geofence boundary 210 may be established by an optional geofence transmitter 232 or by monitoring signal strength or interruptions in communications through other wireless communications channels used by the PSA 100 and other systems in a store. Each PSA 100 checked out from the PSA dispensing station 216 may monitor its location relative to the geofence boundary by monitoring wireless communications with other systems, by communications between the geofence transceiver 156 and the geofence transmitter 232 to determine the PSA's location relative to the geofence boundary, or by the processor in the PSA analyzing camera images to determine the PSA's location in the store. For example, 1D or 2D bar code labels on store shelves used to identify products on the shelves may be detected by the upper video camera to form an accurate estimate of the PSA's location in the store. Alternatively, video images may be analyzed to read other location-related labels, such as aisle number markings, or images may be analyzed to identify a product in view of the camera. Or, signals from beacon transmitters may be used by the PSA 100 to determine its location in the store. Any of these methods may be used individually or in any combination to give a sufficiently accurate position estimate to determine the current location in a store of a PSA 100. A location estimate may be considered to be sufficiently accurate when the estimate places the PSA and customer on the correct aisle in the store, and possibly when the estimated location is within about ten feet (about three meters) of the actual location, a distance short enough for many people to visually recognize items on nearby store shelves.

An embodiment 1000 configured to estimate its physical location inside a store may optionally display directions to a location 266 of an item of interest 268 from the customer's location 262 in the store. Directions 264 may be shown on a PSA 100 as text, by an efficient walking path shown on a map of the store, by a sequence of audible phrases issued from the PSA, or by combinations of these methods. Directions 264 may be updated in near-real-time as the customer moves along aisles 272 and product shelves 270 through the store. Directions may optionally be obtained by a customer from an interaction with a customer support representative during a VOIP call placed from a PSA. The customer support representative may optionally download directions to the specific PSA being used by the customer.

An example 252 of a PSA detached from a PSA dock on a shopping cart or basket and from the PSA dispensing station is shown in FIG. 10. The detached PSA 252 may have some of its operational features disabled while it is detached from the shopping cart.

When a shopper indicates to the PSA 100 that shopping is completed, for example by a voice command recognized by the PSA, the shopper may approach an automated check-out station 220 to submit the cart inventory to the automated station 220 over a wireless communications link 230 and pay for the purchased items by a credit card or debit card reader on the station 220. A PSA may optionally be configured to automatically initiate check-out communications when the PSA and cart are within close proximity of a check-out station. The amount of time needed to submit the cart inventory to the check-out station 220 and pay by debit or credit card at the station is sufficiently short to avoid the formation of long lines at the automated check-out stations, particularly in comparison to the lines that may form at a manual check-out station 218. Customer purchase information may be transmitted from manual 218 and automated 220 check-out stations to the supervisory control system 222.

A method of using a PSA embodiment to improve a customer's shopping experience may be described by any one or more of the following steps, which may be applied in any combination or subcombination, possibly in a different order than shown here:

attaching the PSA to a shopping container; detecting a placement of the product in the shopping container; scanning an identification code for the product with a product code reader on the PSA; maintaining an inventory list of items placed in the shopping container; and communicating the inventory list to a check-out station.

The method of using a PSA embodiment may further include any one or more of the following optional activities, possibly in a different order than shown here: dispensing a PSA from a PSA dispensing station; collecting identifying information about a shopper requesting the dispensing of the PSA from the PSA dispensing station; attaching the PSA to a PSA dock on the shopping container; the PSA detecting when an item placed in the shopping container has been removed from the shopping container; the detecting the placement of the product in the shopping container includes processing an image from a video camera on the PSA; the detecting a placement of the product in the shopping container includes receiving a motion detected signal from a motion detector on the PSA; determining a direction from which the product entered the shopping container; displaying a request on the PSA to scan the identification code of the product detected to have been placed in the shopping container; detecting an item placed in an under-cart region; disabling operational features of a PSA after the PSA has been disconnected from a PSA dock; establishing a geofence boundary corresponding to an allowed operating area for customer use of the PSA; the PSA displaying an alarm message when the PSA is moved outside the geofence boundary; initiating a voice over internet (VOIP) audio and/or video call from the PSA; removing the PSA from the shopping container after shopping is completed; re-inserting the PSA into a PSA dispensing station; confirming that an identified shopper has returned the PSA to the PSA dispensing station; displaying on the PSA a location of a product in a store; and transmitting the inventory list in the PSA to a check-out station.

Another example embodiment 1000 includes a processor 136, circuitry 110 configured to read product codes, and a video camera 114 positioned to view essentially all of the space for carrying items in a basket of a shopping container when the PSA is attached to the shopping container. The processor may be configured to perform operations including detecting a placement of the product in the shopping container; scanning an identification code for the product with the circuitry configured to read product codes 110; maintaining an inventory list 308 of items placed in the shopping container; and communicating the inventory list to a check-out station (218, 220). Circuitry configured to read product codes may also be referred to as a product code reader 110. An identification code for a product may also be referred to as a product code 298.

As suggested in the example of FIG. 10, an embodiment 1000 may operate autonomously from a supervisory control system while the PSA 100 is within the geofence boundary 210, optionally keeping track of the customer's current location 262 and optionally accessing a database of the location 266 of each item 268 in the store 224. The example embodiment 1000 including a processor 136 may further configure the processor to perform operations including offering an advertiser a subscription for rights to send promotional, marketing, and/or advertising communications to targeted customer groups selected according to specified advertising conditions including, but not limited to, specified locations 266 in a store, specified time(s) of day, and specified demographic groups of customers visiting the store, then transmitting advertising content such as video, audio, text, and/or photographs to selected PSAs checked out by customers meeting the advertising conditions. Content may be downloaded into a PSA 100 while the PSA is docked at the dispensing station 216 and may optionally be transmitted over the wireless network from a WiFi router 292. Content from advertisers may optionally be stored on the supervisory control system 222. Stored advertising content in a PSA and/or supervisory control system may be deleted when a subscription time period ends, after a specified number of transmitted promotional messages to one or more PSAs, or for other reasons.

For example, a PSA approaching a specified location 266 in a store may automatically display a video promotional or advertising message for a product near the PSA's location. A PSA may automatically play an audio message offering a greeting or thank-you message to a customer from the manufacturer of one of the customer's previous purchases. A discount coupon may be displayed on a PSA to encourage a new customer to make a purchase or to encourage purchases of an item for which the store seeks increased sales volume or revenue. These examples of audio, video, and/or text messages may be downloaded to a PSA from a supervisory control system and stored on the PSA for later retrieval and presentation by the PSA. Alternatively, the messages may be transmitted from the supervisory control system and stored for later presentation on a PSA, messages may streamed from the supervisory control system for near-real-time presentation on a PSA, or messages may be configured for push messaging to be displayed upon receipt by a PSA while a customer moves about a store.

The shopping cart 200 in the previous examples may be an unpowered cart intended to be pushed or pulled by a person. An embodiment 1000 may optionally be connected to a shopping cart or scooter equipped with motors for propelling the cart. A powered shopping cart may optionally be further equipped for self-guiding or self-driving, i.e., the cart may be capable of moving through the store to a selected destination without colliding with people or objects in the store and without a person pushing, pulling, or carrying the cart. A self-driving shopping cart may be referred to as an autonomous shopping cart.

An example embodiment 1000 including a PSA 100 may be attached to a self-driving shopping cart 312, as suggested in FIG. 10. Examples of data communicated from the PSA 100 to the self-guiding shopping cart 312 data include, but are not limited to, the PSA location in the store 300, the location of an item of interest 266, and a path to be followed 264. Communications between the PSA 100 and a guiding apparatus in the self-driving shopping cart may be performed through the wired communications interface 154 and/or the wireless communications interface 152 in the PSA 100. The PSA 100 may perform such actions without communicating with or oversight from another system, for example the supervisory control system 222. The PSA 100 may optionally receive data from the supervisory control system about allowed areas for self-driving shopping carts and/or areas where self-driving operations are not permitted.

Information about each PSA's location 300 and path 264 may optionally be exchanged between PSAs, for example through the wireless network 294 in the store and/or an ad hoc network 290 formed with other PSAs, possibly to reduce a chance of collision between shopping carts. A PSA 100 may optionally negotiate with other PSAs to reduce congestion from too many shopping carts following a same path at about the same time or from too many carts arriving at a same destination at about the same time. A PSA may negotiate with other PSAs to alter a path to be followed by a self-driving shopping cart or to modify directions issued to a customer pushing a manually-guided cart.

A PSA checked out to a customer 250 may communicate with other checked-out PSAs and/or the supervisory control system 222 to form an estimate of a length of a check-out line at each check-out station (218, 220), identify a check-out station with no customers at the station, estimate an amount of time needed to complete check-out, and so on. Such information may be exchanged between PSAs on self-driving carts 312 with other PSAs on self-driving carts 312, between PSAs on self-driving carts 312 and carts being manually guided 314, and/between PSAs on manually-guided carts 314. After check-out is complete, a PSA may display a personalized message thanking the customer for his or her business and a reminder to return the PSA to the PSA dispensing station 216.

Unless expressly stated otherwise herein, ordinary terms have their corresponding ordinary meanings within the respective contexts of their presentations, and ordinary terms of art have their corresponding regular meanings.

What is claimed is:

1. An apparatus, comprising:
 a personal shopping assistant (PSA), comprising:
  an enclosure having an enclosure front side;
  a processor configured to display an alarm indication when said PSA is outside a geofence boundary and to operate an LED bar in a plurality of illumination patterns, said illumination patterns corresponding to operating statuses of said PSA;
  a flat panel display mounted in said enclosure and visible toward said enclosure front side;
  a product code reader coupled to said enclosure front side;
  a first video camera coupled to said enclosure front side, said first video camera positioned to view essentially all of a space for carrying items in a basket of a shopping container when said PSA is attached to the shopping container;
  a second video camera coupled to said enclosure, said second video camera positioned to record a person facing said enclosure front side; and
  a first motion detector coupled to said enclosure front side, said first motion detector positioned to detect an item moving into the shopping container,
 wherein said enclosure further comprises an indicator light configured for activation by said processor when a product detected by said first video camera and/or said first motion detector has not been scanned by said product code reader, and said flat panel display, said product code reader, said first video camera, said second video camera, and said first motion detector are connected for data communication with said processor.

2. The apparatus of claim 1, further comprising a PSA dock configured for attachment to the shopping container.

3. The apparatus of claim 2, wherein said PSA dock is configured for removable connection with said PSA.

4. The apparatus of claim 1, further comprising:
 a microphone positioned on said enclosure, said microphone connected to a signal conditioning and analog-to-digital conversion circuit in data communication with said processor; and
 an audio speaker positioned on said enclosure, said audio speaker connected to an audio amplifier and a digital-to-analog conversion circuit in data communication with said processor.

5. The apparatus of claim 1, wherein said first video camera is positioned below said flat panel display on said enclosure front side.

6. The apparatus of claim 4, wherein said processor, said microphone, said audio speaker, and said second video camera are configured for placing a voice-over-internet (VOIP) audio and/or a video call from said PSA.

7. The apparatus of claim 1, further comprising a second motion detector coupled to said enclosure front side and connected for data communication with said processor, said second motion detector positioned to detect the item moving into the shopping container from a first side of the shopping container.

8. The apparatus of claim 7, further comprising a third motion detector coupled to said enclosure front side and connected for data communication with said processor, said third motion detector positioned to detect the item being moved into the shopping container from a second side opposite said first side of the shopping container.

9. The apparatus of claim 1, further comprising a wireless communication transceiver connected for data communication with said processor.

10. The apparatus of claim 1, further comprising a radio frequency identification (RFID) circuit connected for data communication with said processor.

11. The apparatus of claim 7, wherein:
 said first motion detector is coupled to said front side of said enclosure above said flat panel display; and
 said second motion detector is coupled to said front side of said enclosure below said flat panel display.

12. The apparatus of claim 7, wherein said first motion detector is positioned on said enclosure front side to detect an item entering the shopping container from above before said second motion detector detects the item.

13. The apparatus of claim 8, wherein said third motion detector is coupled to said enclosure front side below said flat panel display.

14. The apparatus of claim 8, wherein said second motion detector is positioned to detect an item entering the shopping basket from said first side before said third motion detector detects the item.

15. The apparatus of claim 8, wherein said third motion detector is positioned to detect an item entering the shopping basket from said second side before said second motion detector detects the item.

16. An apparatus, comprising:
 a personal shopping assistant (PSA) comprising:
 an enclosure comprising an enclosure front side;
 a PSA dock configured to attach said enclosure to a shopping cart;
 a flat panel display mounted in said enclosure, said flat panel display positioned for viewing toward said enclosure front side;
 a product code reader positioned to read outward from said enclosure front side;
 a first video camera positioned in said enclosure with an first video camera field of view extending outward from said enclosure front side;
 a second video camera mounted in said enclosure with a second video camera field of view extending outward from said enclosure front side;
 a motion detector positioned on said enclosure to detect motion in front of said enclosure front side; and
 a processor in said enclosure, said processor connected for data communication with said PSA dock, said flat panel display; said product code reader, said first video camera, said second video camera, and said motion detector, said enclosure further comprising an indicator light configured for activation by said processor when a product detected by said first video camera and/or said first motion detector has not been scanned by said product code reader, said processor configured to display an alarm indication when said PSA is outside a geofence boundary, and said processor configured to operate an LED bar in a plurality of illumination patterns, said illumination patterns corresponding to operating statuses of said PSA.

17. The apparatus of claim 16, further comprising:
 a memory connected for data communication with said processor;
 said processor configured to retrieve a promotional message from said memory; and
 said processor configured to send said promotional message to said flat panel display.

18. The apparatus of claim 17, further comprising:
 a wireless communications interface connected for data communication with said processor; and
 said processor configured to receive said promotional message from said wireless communications interface.

* * * * *